US011095607B2

(12) United States Patent
Bansal et al.

(10) Patent No.: US 11,095,607 B2
(45) Date of Patent: Aug. 17, 2021

(54) METHOD OF TRANSLATING A LOGICAL SWITCH INTO A SET OF NETWORK ADDRESSES

(71) Applicant: Nicira, Inc., Palo Alto, CA (US)

(72) Inventors: Kaushal Bansal, Pleasanton, CA (US); Uday Masurekar, Sunnyvale, CA (US)

(73) Assignee: NICIRA, INC., Palo Alto, CA (US)

( * ) Notice: Subject to any disclaimer, the term of this patent is extended or adjusted under 35 U.S.C. 154(b) by 0 days.

(21) Appl. No.: 16/684,862

(22) Filed: Nov. 15, 2019

(65) Prior Publication Data

US 2020/0084179 A1 Mar. 12, 2020

Related U.S. Application Data

(63) Continuation of application No. 15/421,183, filed on Jan. 31, 2017, now Pat. No. 10,547,588.

(60) Provisional application No. 62/330,130, filed on Apr. 30, 2016.

(51) Int. Cl.
G06F 15/177 (2006.01)
H04L 29/12 (2006.01)

(52) U.S. Cl.
CPC ...... *H04L 61/2061* (2013.01); *H04L 61/2015* (2013.01); *H04L 61/2507* (2013.01); *H04L 61/2521* (2013.01); *H04L 61/6068* (2013.01)

(58) Field of Classification Search
None
See application file for complete search history.

(56) References Cited

U.S. PATENT DOCUMENTS

| 6,769,000 | B1* | 7/2004 | Akhtar .................. H04L 29/06 |
| 2004/0261116 | A1 | 12/2004 | Mckeown et al. |
| 2006/0185014 | A1 | 8/2006 | Spatscheck et al. |
| 2007/0002761 | A1 | 1/2007 | Diamant et al. |
| 2007/0147261 | A1 | 6/2007 | Schumacher et al. |
| 2013/0044636 | A1 | 2/2013 | Koponen et al. |
| 2013/0121209 | A1 | 5/2013 | Padmanabhan et al. |
| 2014/0310428 | A1* | 10/2014 | Avital ................ H04L 61/1511 709/245 |
| 2014/0325040 | A1 | 10/2014 | Moore |
| 2015/0052522 | A1* | 2/2015 | Chanda .................. G06F 9/455 718/1 |
| 2015/0058968 | A1* | 2/2015 | Wang .................. H04L 63/0281 726/12 |
| 2015/0103838 | A1* | 4/2015 | Zhang ................... H04L 45/38 370/401 |
| 2015/0207683 | A1 | 7/2015 | Adogla |

(Continued)

Primary Examiner — Phyllis A Book
(74) Attorney, Agent, or Firm — Adeli LLP

(57) ABSTRACT

A method of providing a set of network addresses associated with a managed forwarding element (MFE) in a logical network that includes a set of data compute nodes (DCNs). The DCNs are hosted on a set of physical hosts. Each DCN is connected to an MFE on the corresponding host. The method receives a request to translate an MFE into a set of network addresses, the request comprising an identification of the MFE. The method identifies a logical network entity associated with the MFE based on the identification of the MFE. The method identifies a set of network addresses associated with the identified network entity and provides the set of network addresses as the set of network addresses associated with the identified network entity.

20 Claims, 10 Drawing Sheets

(56) References Cited

U.S. PATENT DOCUMENTS

| | | | |
|---|---|---|---|
| 2015/0222598 A1* | 8/2015 | Koponen | H04L 49/70 726/13 |
| 2015/0237002 A1* | 8/2015 | Baniqued | H04L 61/2015 709/220 |
| 2016/0359897 A1 | 12/2016 | Yadav et al. | |
| 2017/0187703 A1* | 6/2017 | Enrique Salpico | H04L 63/1458 |
| 2017/0288981 A1 | 10/2017 | Hong et al. | |
| 2017/0317972 A1 | 11/2017 | Bansal et al. | |

* cited by examiner

705

High Level Firewall Rules with Higher Level AppliedTo Identifiers

| Source | Source Port | Destination | Destination Port | Service | Action | AppliedTo |
|---|---|---|---|---|---|---|
| WS1 740 | * | Any VM connected to MFE1 in Host 1 | * | Any | Allow | Compute Cluster X |
|  |  |  |  |  |  |  |
| Any VM connected to MFE X in Host Y | * | Any | * | Any | Deny | Data Center Y |
| AS1 745 | * | DBS1 750 | * | https | Deny | Logical Switch 5 |

790 → (points to WS1 row)
735, 730, 755, 760, 712

710

Low Level Firewall Rules with Lower Level AppliedTo Identifiers

| Source | Source Port | Destination | Destination Port | Service | Action | AppliedTo |
|---|---|---|---|---|---|---|
| 190.120.0.32 | * | 192.155.5.32/26 | * | Any | Allow | VNIC 1, VNIC A, ... |
|  |  |  |  |  |  |  |
| 192.169.5.0/26 | * | Any | * | Any | Deny | * |
| 190.144.64.32 | * | 192.160.32.32 | * | https | Deny | VNIC M, ... |

715

Host Level Rules Tables

| Source | Source Port | Destination | Destination Port | Service | Action | AppliedTo |
|---|---|---|---|---|---|---|
| 190.120.0.32 | * | 192.155.5.32/26 | * | Any | Allow | VNIC A, ... |
|  |  |  |  |  |  |  |

720

VNIC Level Rules Tables

| Source | Source Port | Destination | Destination Port | Service | Action |
|---|---|---|---|---|---|
| 190.120.0.32 | * | 192.155.5.32/26 | * | Any | Allow |
|  |  |  |  |  |  |

*Fig. 7*

METHOD OF TRANSLATING A LOGICAL SWITCH INTO A SET OF NETWORK ADDRESSES

CLAIM OF BENEFIT TO PRIOR APPLICATIONS

This application is a continuation application of U.S. patent application Ser. No. 15/421,183, filed Jan. 31, 2017, now published as U.S. Patent Publication 2017/0317972. U.S. patent application Ser. No. 15/421,183 claims the benefit of U.S. Provisional Patent Application 62/330,130, filed Apr. 30, 2016. U.S. Provisional Patent Application 62/330,130 and U.S. patent application Ser. No. 15/421,183, now published as U.S. Patent Publication 2017/0317972, are incorporated herein by reference.

BACKGROUND

Software defined networking (SDN) is one of the most indispensable parts of software defined data center (SDDC). SDN provides an abstraction of physical networking infrastructure and defines logical networking devices such as logical switches, logical routers, etc. Similar to physical networking devices, these logical devices provide functionalities that are close to physical ones and are transparent to virtual machines (VMs) in the SDDC.

Logical devices provide benefits that the physical devices could not furnish. For instance, logical devices could be linked with each other by just defining the topology configuration while physical devices need physical cables to be attached. Logical devices could be distributed entities while physical devices must be single entities. Since logical devices are software driven, distributed solutions are widely preferred and used by the SDN in the SDDC.

Many applications in a data center require applying rules that are based on network addresses. For instance, entity based firewall rules for a distributed firewall are configured based on network addresses. The firewall rules for different logical entities are then enforced by a forwarding element (or logical switch) based on the source and destination network addresses in the packet headers. There is currently no efficient way of translating logical entities connected to a forwarding element into network addresses for consumption by the applications that require the logical entities' network addresses.

BRIEF SUMMARY

Some embodiments provide a method of translating a managed forwarding element (MFE) into a set of network addresses. These embodiments determine a subnet or a set of network addresses associated with logical entities connected to the MFE. The translation in some embodiments is performed by an address translation engine. In some embodiments, an application such as a distributed firewall invokes the translation engine and requests the IP addresses associated with an MFE. The translation engine invokes different providers to resolve the MFE into a set of subnets. The translation engine in some embodiments is a part of a network manager. The translation providers in some embodiments are entities such as DHCP servers, spoof guards, logical routers, and the MFEs.

The address translation engine receives an identifier of an MFE with a request to translate (or map) the MFE into a subnet or a set of IP addresses. Different embodiments use different orders for selecting translation providers to translate an MFE into a set of network addresses. In some embodiments, the address translation engine determines whether spoof guard is configured for the MFE. When spoof guard is configured for the MFE, the address translation engine returns the subnet or subnets associated with the MFE's spoof guard policy. Otherwise, the address translation engine determines whether the MFE is associated with a dynamic host configuration protocol (DHCP) server.

When the MFE is associated with a DHCP server, the address translation engine returns one of the following sets of addresses: one or more network pools, one or more IP addresses (when DHCP has static bindings), or one or more media access control (MAC) addresses (when DHCP has static bindings or when DHCP has learnt from DHCP requests and the MAC addresses are stored as DHCP leases).

Otherwise, if the MFE is connected to a logical router through a router port (which is a logical interface), the address translation engine returns the subnet or subnets that are associated with the logical interface. If none of the mentioned criteria matches, the address translation engine finds all logical ports associated with the MFE and creates a list of the network addresses of all logical ports. The address translation engine then returns the list of networks addresses. Other embodiments utilize different orders to select providers for translating an MFE into a set of network addresses.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIG. 7 conceptually illustrates examples of different firewall rule tables that a controller configures in some embodiments.

DETAILED DESCRIPTION OF THE INVENTION

Figure 1:
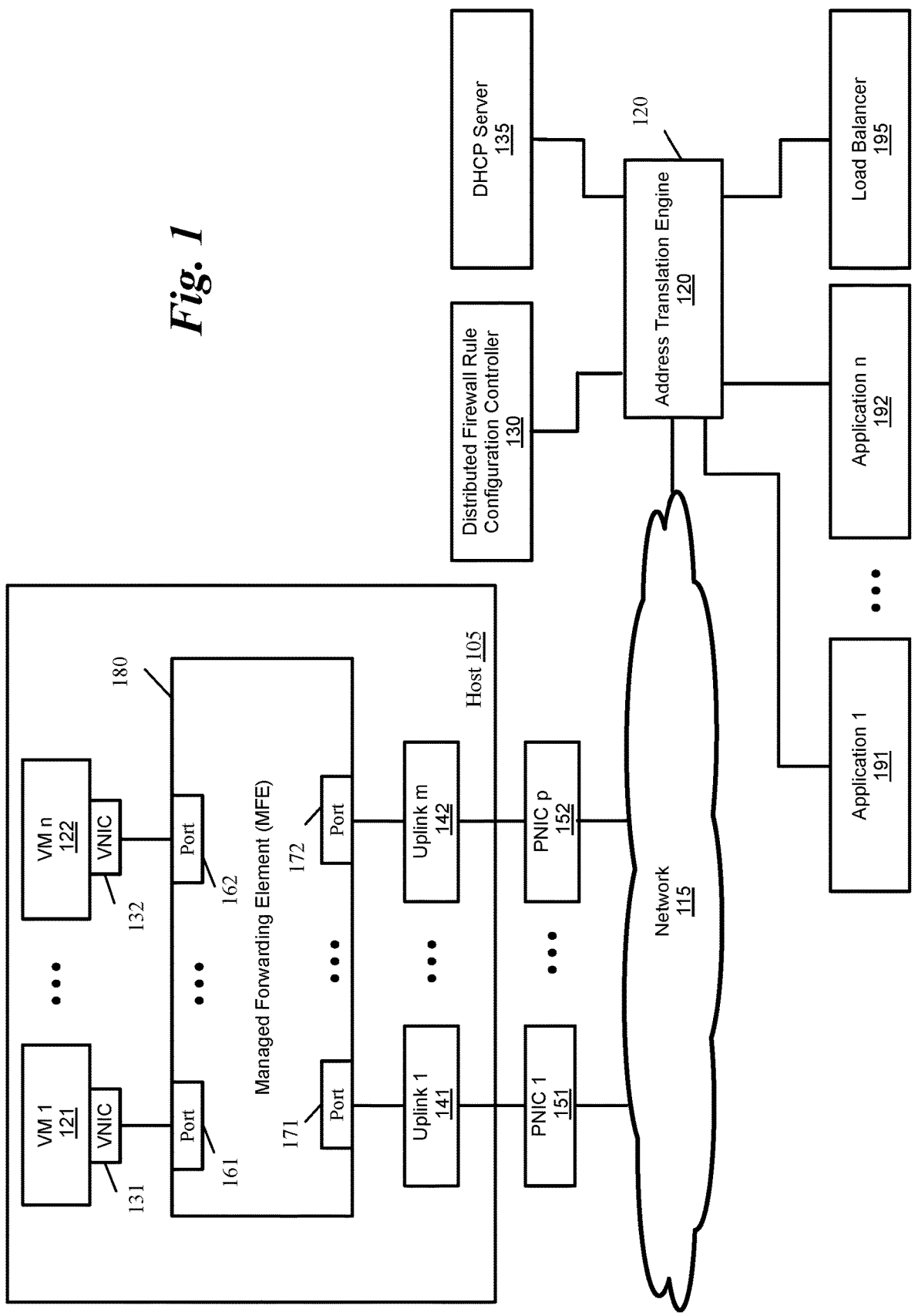
FIG. 1 conceptually illustrates an architecture for translating a forwarding element into a set of network addresses in some embodiments.

In the following detailed description of the invention, numerous details, examples, and embodiments of the invention are set forth and described. However, it should be understood that the invention is not limited to the embodiments set forth and that the invention may be practiced without some of the specific details and examples discussed.

In some embodiments, each host machine in the network includes virtualization software (e.g., a hypervisor) for virtualizing physical resources of the host machine and a host managed forwarding element (MFE) for forwarding network traffic (e.g., data messages) to and from the virtual machines. The host MFE, in some embodiments, operates within the virtualization software. In addition, some host machines include one or more VMs that connect to the host MFE.

In some embodiments, the host MFEs are configured to logically forward data messages according to logical forwarding elements configured by an administrator of the network (e.g., logical switches, logical routers) to implement a logical forwarding element (LFE) of a logical network. In some embodiments, the logical network is an abstract conception of a network generated by an administrator, and the logical network is implemented in a virtualized, distributed manner in a managed physical infrastructure (e.g., in a multi-tenant datacenter). That is, the virtual machines that connect to the LFEs may reside on various different host machines within the infrastructure, and MFEs (e.g., software virtual switches) operating on these host machines implement some or all of the logical forwarding elements (logical switches, logical routers, etc.). In the virtualization field, some refer to software switches as virtual switches as these are software elements. However, in this specification, the software forwarding elements are referred to as MFEs, in order to distinguish them from LFEs, which are logical constructs that are not tied to the physical world. An MFE forwards packets in a physical network whether or not it is implemented in software while an LFE forwards packets in a logical network, which is logically decoupled or abstracted from the physical network. In other words, the software forwarding elements exist and operate in the physical world, whereas an LFE is a logical representation of a forwarding element that is presented to a user when designing a logical network.

In some embodiments, the packet processing operations (e.g., classification operations, forwarding actions, etc.) are performed by the MFE that operates as a software forwarding element. In some embodiments, MFEs operate on host machines that host VMs or other data compute nodes that serve as the sources and destinations for packets (e.g., in the virtualization software of such a host machine). For example, an MFE might operate on a host machine that hosts VMs for several different logical networks, and would implement the several logical networks for each of the virtual machines residing on the host.

I. Translating an MFE into a Set of Network Addresses

Some embodiments provide different methods, which are leveraged for translation (or mapping) of an MFE into subnet or a set of network addresses. A subnet or sub-network is a logical subdivision of addresses in a network. For example, the Internet protocol (IP) addresses are divided into (i) a network (or routing) prefix and (ii) a host identifier or a "rest field". IP addresses in a subnet share the network prefix as an initial sequence of bits in the binary representation of the IP addresses. The network prefix is the most significant portion of each IP address in the subnet and identifies where a device is connected (e.g., identifies a router at the edge or the entry point of a network). The host identifier, which is different for each individual IP address, identifies an individual interface or device on the network.

All devices in the same network (or subnet) have the same network prefix. The network prefix is expressed in Classless Inter-Domain Routing (CIDR) notation, which expresses the network prefix followed by a slash character ("/"), followed by the length of the prefix in bits. For instance, in Internet Protocol Version 4 (IPv4) the IP addresses include 32 bits and 172.16.0.1/20 indicates that 20 bits of the IP address are allocated for the subnet and the remaining 12 bits are used to identify individual hosts on the subnet. In the following discussions, IPv4 IP addresses are used in several examples. The discussions are similarly applicable to other IP protocols such as Internet Protocol version 6 (IPv6).

FIG. 1 conceptually illustrates an architecture for translating an MFE into a set of network addresses in some embodiments. The figure shows a multi-VM host 105. Host 105 is a physical machine that hosts VMs 121-122 or other data compute nodes for one or more tenants. A VM is a software implementation of a machine such as a computer. The host in some embodiments includes virtualization software (not shown), which is a software abstraction layer that operates on top of the hardware and below any operating system in some embodiments.

The host also includes an MFE 180 that operates as a software forwarding element. The MFE performs packet processing operations such as receiving and forwarding packets for the VMs or other data compute nodes that serve as the sources and destinations for packets. For example, the host machine can host VMs for several different logical networks, and the MFE would implement the several logical networks for the VMs residing on the host.

As shown, each VM 121-122 communicates with the MFE 180 through an associated virtual network interface card (VNIC) 131-132. Each VNIC 131-132 is connected to the MFE 180 through a logical port 161-162. The logical ports 161-162 provide network connectivity between the VMs 121-122 and other entities (including other VMs in the datacenter as well as physical/virtual machines outside the datacenter). The datacenter, in some embodiments, is a location that houses multiple hosts, each of which might be dedicated to one tenant or multiple tenants. Each host might be a dedicated non-virtualized (i.e., physical) machine, or it might be a virtualized machine on which multiple VMs execute.

The MFE also sends packets to and receives packets from an external network 115 through ports 171-172, uplinks 141-142, and physical network interface cards (PNICs) 151-152. An uplink is a module that relays packets between the MFE 180 and PNICs in order to perform various packet processing functions on incoming and outgoing traffic.

The figure also shows an address translation engine 120. The address translation engine in some embodiments is a part of a network manager (not shown). The network manager is a virtualized server that is installed on one or more physical servers and is used to define and/or manage the networking resources of a data center. Address translation engine 120 translates the MFE into a set of network addresses. Example of such network addresses is an Open System Interconnection Mode (OSI model) Layer 3 (L3) or network layer address such as Internet Protocol (IP) address. Throughout this specification the term IP address is used as an example of a network address. However, it should be understood that other Layer 3 or Layer 2 (L2) addresses (e.g., MAC addresses) can also be used for translation of an MFE.

As shown, several other applications such as distributed firewall rule configuration controller 130 (that configures distributed firewall rules), a dynamic host configuration protocol (DHCP) server 135 (that dynamically provides IP addresses for network and compute entities), load balancer 195 (that balances load among a set of network nodes), and several other applications 191-192 provide identifier of the MFEs (e.g., the identifier of MFE 180) to the address translation engine 120. The address translation engine 120 provides a set of network addresses corresponding to the MFE to the requesting applications. Although FIG. 1 conceptually illustrates applications 130, 135, and 191-195 to directly communicate with the address translation engine, it should be understood that the address translation engine and these applications can communicate through the network 115.

Figure 2:
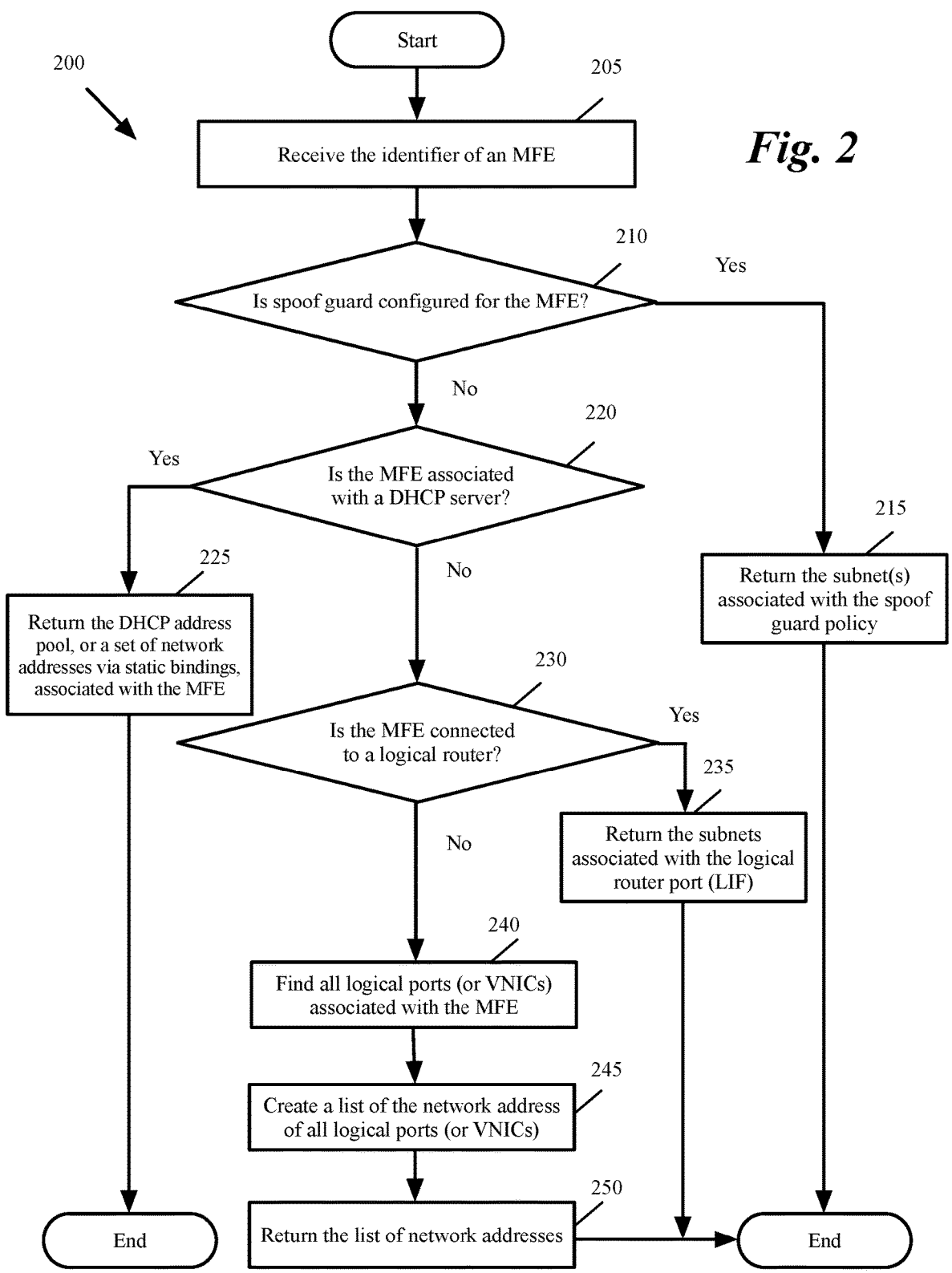
FIG. 2 conceptually illustrates a process for translating an MFE into a set of network addresses in some embodiments.

FIG. 2 conceptually illustrates a process 200 for translating an MFE into a set of network addresses in some embodiments. The process, in some embodiments, is performed by an address translation engine such as address translation engine 120 in FIG. 1. As shown in FIG. 2, the process receives (at 205) an identifier of an MFE. The identifier in some embodiments is an identifier such as a virtual network identifier (VNI) that uniquely identifies the MFE.

Figure 3:
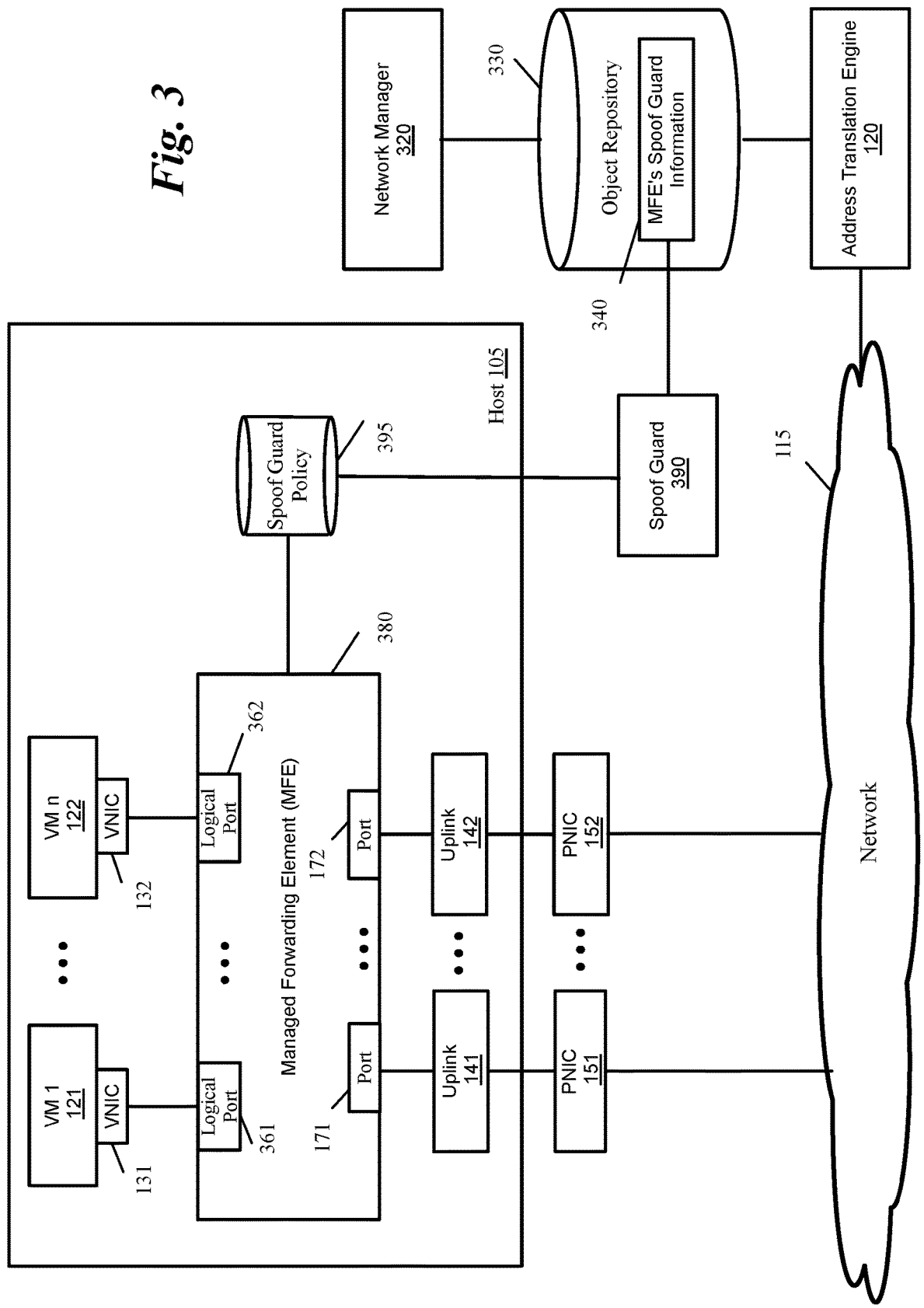
FIG. 3 conceptually illustrates an MFE that is associated with a spoof guard policy in some embodiments.

The process then determines (at 210) whether spoof guard is configured for the MFE. If yes, the process returns (at 215) the subnet or subnets associated with the MFE's spoof guard policy. The process then ends. Otherwise, the process proceeds to 220, which is described below. In some embodiments, MFEs are configured with spoof guard policy in order to protect the MFEs against flooding from unwanted traffic. FIG. 3 conceptually illustrates an MFE that is associated with a spoof guard policy in some embodiments. Host 105 includes several VMs 121-122. VMs 121-122 are connected to an MFE 380 through VNICs 131-132 and logical ports 361-362, respectively. MFE 380 is connected to network 115 through ports 171-172, uplinks 141-142, and PNICs 151-152. The spoof guard policy 395 is configured by spoof guard 390 and associated with an MFE in order to allow legitimate traffic in the MFE.

The spoof guard configuration includes a set of one or more valid subnet addresses. If the traffic entering the MFE does not match that subnet addresses, the traffic is not forwarded and is dropped. The spoof guard subnet address (or subnets addresses) can be leveraged for translating the logical switch into a set of subnets. The same subnet (or subnets) can further be leveraged, e.g., in the firewall rules configured for the MFE.

The spoof guard 390 operates separately from the firewall rules and allows blocking of the traffic determined to be spoofed. The spoof guard 390 collects a list of authorized network addresses for the MFE 380. The list of authorized addresses is stored as one or more subnets in the spoof guard policy 395 of the MFE 380. The spoof guard policy is used by the MFE to determine whether packet traffic received by the MFE are from authorized sources.

In some embodiments, the spoof guard configuration is stored in a common storage (such as an object repository of the network manager) in the datacenter. As shown, the network manager 320 stores the spoof guard information 340 (including the subnet or subnets associated with the MFE's spoof guard policy) in an object repository 330. The address translation engine 120 retrieves the MFE's spoof guard policy information from the network manager object repository 330.

Referring back to FIG. 2, when the MFE does not have a spoof guard policy, the process determines (at 220) whether the MFE is associated with a DHCP server. If not, the process proceeds to 230, which is described below. Otherwise, the process returns (at 225) one of the following sets of DHCP related addresses: one or more DHCP network address pools, one or more IP addresses via static bindings (when DHCP has static bindings), or one or more MAC addresses through static bindings (when DHCP has static bindings or when DHCP has learnt from DHCP requests and the MAC addresses are stored as DHCP leases). The process then ends.

Figure 4:
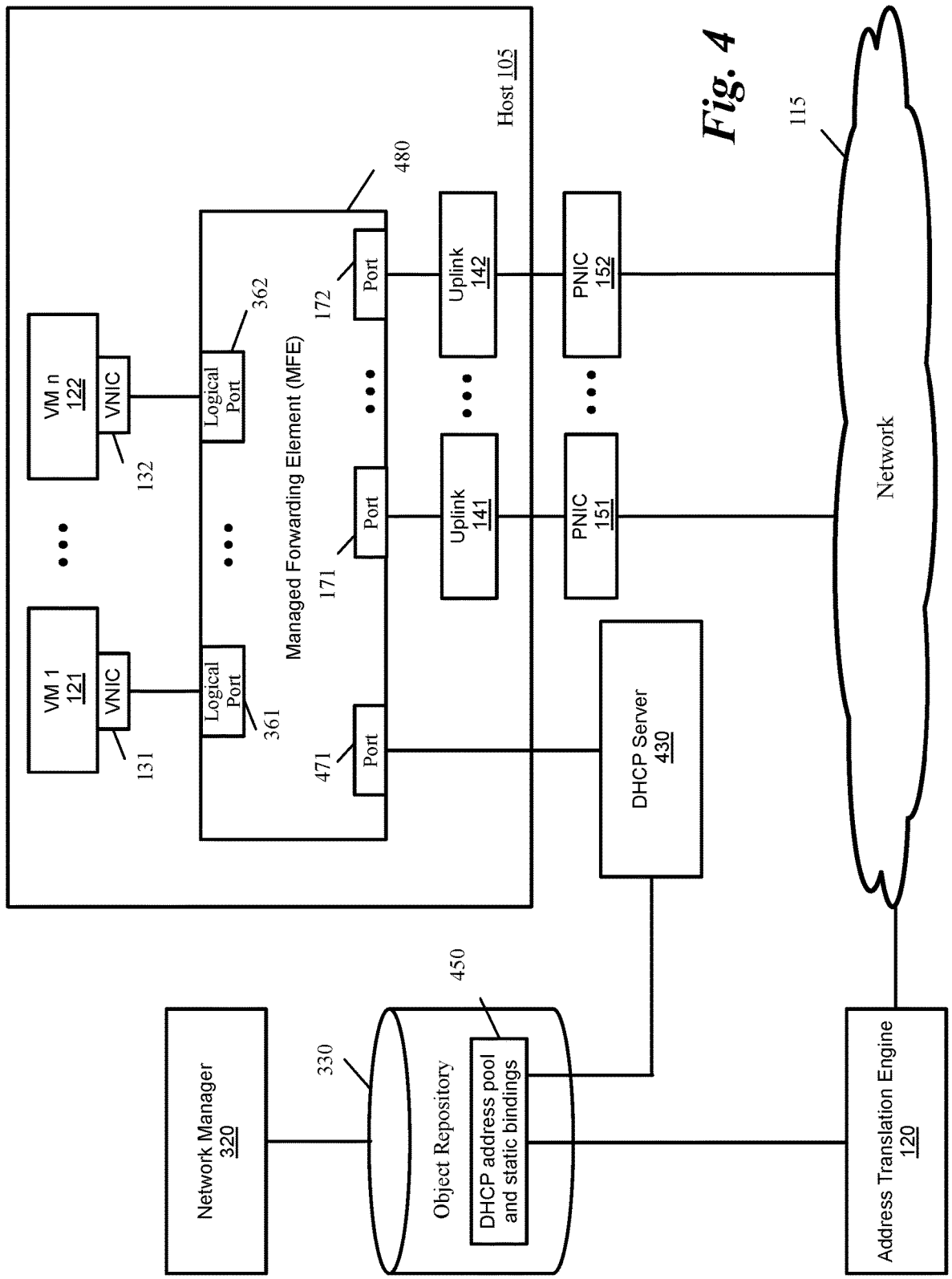
FIG. 4 conceptually illustrates an MFE that is associated with a DHCP server in some embodiments.

FIG. 4 conceptually illustrates an MFE that is associated with a set of DHCP addresses in some embodiments. Each MFE in the network must have a unique network address (e.g., a unique IP address) to access the network and its resources. In order to avoid manual configuration of IP addresses for the MFEs, some embodiments utilize a DHCP server that maintains a pool of network addresses and provides an address to any DHCP-enabled client such as the MFE 480 when it starts up on the network.

As shown, the DHCP server 430 maintains (e.g., as a set of tables) a DHCP address pool and static bindings 450 (including the static bindings for MFE 480) in the network manager object repository 330. When an MFE (such as MFE 480) is configured, the DHCP service allocates a network address from the DHCP address pool 450 to the MFE. Similarly, when a VM, a port, or a VNIC that is connected to the MFE is configured, the DHCP server allocates an IP address from the DHCP address pool to the VM, port or VNIC. The address translation engine 120 queries DHCP server tables to find entries corresponding to MFE 480. The address translation engine 120 retrieves the IP address pools and static bindings associated with the MFE and returns these addresses as the MFE translation.

Referring back to FIG. 2, when the MFE is not associated with a DHCP server, the process determines (at 230) whether the MFE is connected to a logical router. When an MFE is connected to a logical router, a router port or logical interface (LIF) is configured for the MFE. If the MFE is connected to a logical router, the process returns (at 235) the subnet or subnets associated with LIF. The process then ends. Otherwise the process proceeds to 240, which is described below.

Figure 5:
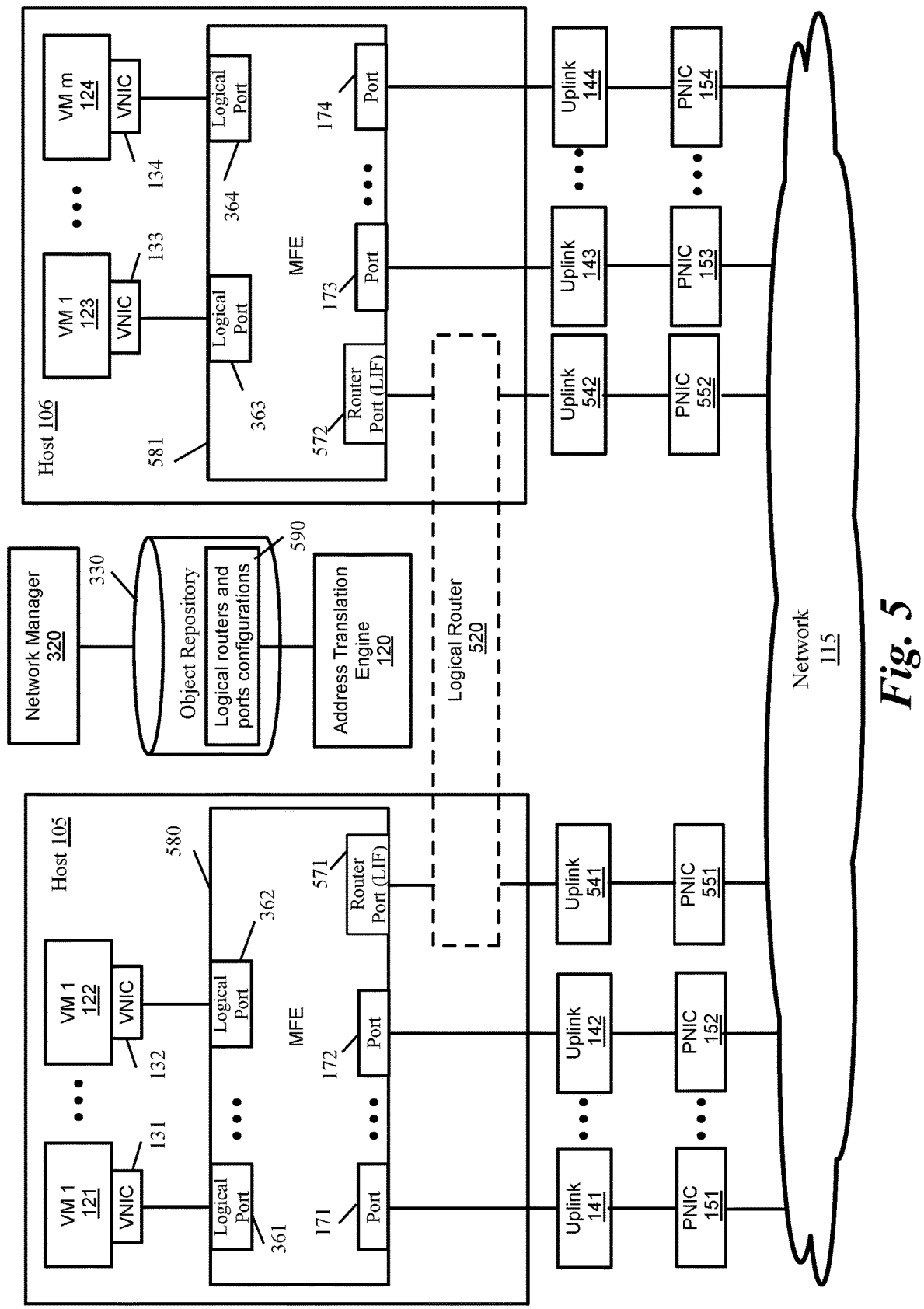
FIG. 5 conceptually illustrates several MFEs that are connected to a logical router in some embodiments.

FIG. 5 conceptually illustrates several MFEs that are connected to a logical router in some embodiments. The figure shows several hosts 105-106. Host 105 includes several VMs 121-122. VMs 121-122 are connected to an MFE 580 through VNICs 131-132 and logical ports 361-362, respectively. MFE 580 is connected to network 115 through ports 171-172, uplinks 141-142, and PNICs 151-152.

Host 106 includes several VMs 123-124. VMs 123-124 are connected to an MFE 581 through VNICs 133-134 and logical ports 363-364, respectively. MFE 581 is connected to network 115 through ports 173-174, uplinks 143-144, and PNICs 153-154.

As shown, each MFE 580-581 is connected to a logical router 520. A logical router connects a set of LFEs to which VMs logically attach. Each LFE represents a particular set of IP addresses such as a subnet, and is implemented in the managed network across a set of MFEs to which the VMs physically connect (e.g., through virtual interfaces). In some embodiments, the logical routers are implemented in a distributed fashion as well by the MFEs that connect to the virtual machines. As shown, logical router 520 spans across hosts 105-106.

MFE 580 is connected to logical router 520 through router port 571. Similarly, MFE 581 is connected to logical router 520 through router port 572. Router port 571 is also referred to as a logical interface (LIF). A LIF in some embodiments is associated with a set of one or more network addresses (e.g., a subnet) that is associated with a number of attributes such as a firewall policy, a routing group, a role, a home port, a home node, and a list of ports for failover purposes.

In the example of FIG. 5, a LIF is configured on router port 571. The figure illustrates the scenario where distributed routing is configured in the datacenter. The MFE 580 is configured to participate in routing and is configured to include a router port (or LIF) 571. The router port (or LIF) 571 is configured to associate with a subnet for the port's desired functioning. In some embodiments, the MFE 580 is configured to serve a single subnet, which is associated with the router port 571. Hence the MFE can be translated into the subnet address that is configured for the router port (or LIF).

In some embodiments, the configurations of MFE 580 and router port (LIF) 571 are stored in some common store (such as the network manager object repository). As shown, the object repository 330 includes one or more tables 590 that store the configuration information of all logical routers and logical router ports. Address translation engine 120 looks up (or queries) into these tables for logical router port 571 and gets associated IP and net mask. Address translation engine then determines the CIDR (or actual subnet-mask) that is associated with the MFE to which that logical router port is connected.

Referring back to FIG. 2, when the MFE is not connected to a logical router, the process finds (at 240) all logical ports associated with the MFE (e.g., logical ports 161-162 in FIG. 1). The process then creates (at 255) a list of the network address of all logical ports. The process then returns (at 260) the list of networks addresses. The process then ends. The address translation engine (e.g., the address translation engine 120 in FIG. 1) iterates over all logical ports 161-162 or all VNICs 131-132 configured on the MFE 180 and collects IP addresses associated with either the logical ports 161-162 or VNICs 131-132. Similar to what was described above, in some embodiments the configurations of MFE 580, logical ports 161-162 and VNICs 131-132 are stored in some common store (such as the network manager object repository). Address translation engine 120 looks up (or queries) into the object repository and gets the IP addresses of the logical ports or VNICs.

Although FIG. 2 shows a particular order (spoof guard, followed by DHCP server, followed by logical router, followed by the list of port network addresses) for using different providers to translate the MFE into a set of network addresses, it should be understood that any other orders for selecting the service providers could be used.

II. Utilizing the Translated MFE Addresses

Applications such as distributed firewall rule configuration controller 130, load balancer 195, DHCP server 135, or any other application 191-192 shown in FIG. 1 may use the translation of an MFE into a subnet or a set of IP addresses. An exemplary use case for translating an MFE into a subnet or a set of network addresses is the consumption of the MFE into an entity (or object) based firewall rule configuration for a distributed firewall.

Distributed firewalls are host-resident security software applications. The distributed firewall security policy is centrally defined using an application programming interface (API). The firewall policy is enforced at each individual host that participates in the distributed firewall.

Entity based firewall rules are based on objects such as datacenters, clusters, and VM names; network constructs such as IP or IPSet addresses (an IPSet is a set of IP addresses), distributed logical switch port-groups associated with virtual local area network (VLAN), MFEs, or security groups that are formed by a set of one or more VNICs, VMs, hosts, compute constructs and/or network constructs. The entity based firewall rules are in some embodiments enforced by an IP based MFE at the datapath level, which can only consume IP address based rules.

Typically, firewall rule definitions include the following five tuples: source, source port, destination, destination port, and service (or application), in addition to an action value. In some embodiments, the firewall rules include an additional tuple (referred to herein as the AppliedTo tuple). The AppliedTo tuple lists a set of enforcement points (network nodes) at which the firewall rule has to be applied.

In some embodiments, the enforcement points are defined in terms of (1) VNICs, VMs, hosts, or other compute constructs (e.g., compute clusters, datacenters, etc.), (2) network elements, such as MFEs, LFEs, other managed appliances, unmanaged third-party appliances (e.g., third party firewalls), and/or combination of such elements, and/or (3) security groups that are formed by a set of one or more VNICs, VMs, hosts, compute constructs and/or network constructs. For instance, an AppliedTo firewall rule can be limited (by the AppliedTo tuple) to a VNIC that connects a VM to a logical port of an MFE.

Software firewalls can be implemented as either a service-node firewall or VNIC level firewall. The service-node firewalls are similar to their hardware counterparts and enforce firewalling capabilities at the boundaries. Hence, they have the same disadvantages as hardware firewalls, i.e., they are choke points for the network traffic and fail to provide security for the intra network traffic (i.e., for virtual machines behind the choke point). VNIC-level firewalls, on the other hand, enforce security policies as soon as packet comes out of the VM's VNIC. Hence, they can provide security for intra-VM traffic. In some embodiments, the firewall rules are enforced at the VNIC. The MFE passes data to the VNICs and VNICs enforce the firewall rules.

In some embodiments, the network nodes that receive the AppliedTo firewall rules specify, based on the received AppliedTo firewall rules, one or more firewall rule tables for one or more data end nodes (e.g., VMs, VNICs, machines, or other network elements) that connect to the nodes. The network nodes of some embodiments use the AppliedTo tuples in the received AppliedTo firewall rules to identify the data end nodes for which the network nodes need to create the firewall rule tables. The specified firewall rule tables in some embodiments no longer have the AppliedTo tuples.

Examples of such firewall rule tables include VNIC-level firewall tables that a host creates for the VNICs of the VMs that are executing on the host. Each VNIC-level firewall rule table contains only the set of rules that are applicable to a particular VM's VNIC, and this set of rules is smaller than the overall number of rules that the host stores for all the VMs executing on it. Having a lot of unnecessary rules slows the processing of these rules by firewall engine on each packet in/out of the virtual machine. Conversely, due to its smaller size, the VNIC-level firewall rule table is faster to search than a larger, bloated rule table.

Some embodiments of the invention provide a controller for specifying firewall rules. The controller provides the ability to specify for a particular firewall rule, a set of network node locations (or a set of enforcement points) at which the particular firewall should be enforced. To provide this ability, some embodiments add the extra AppliedTo tuple to a firewall rule. The AppliedTo tuple lists the set of enforcement points at which the firewall rule has to be applied (i.e., enforced).

The controller of some embodiments allows the AppliedTo firewall rules (1) to be specified (e.g., by a network administrator or by an automated firewall configurator) in terms of higher-level enforcement point identifiers, but then (2) to be distributed in terms of lower-level enforcement point identifiers that are decipherable or easier to decipher by the firewall-enforcing devices.

Figure 6:
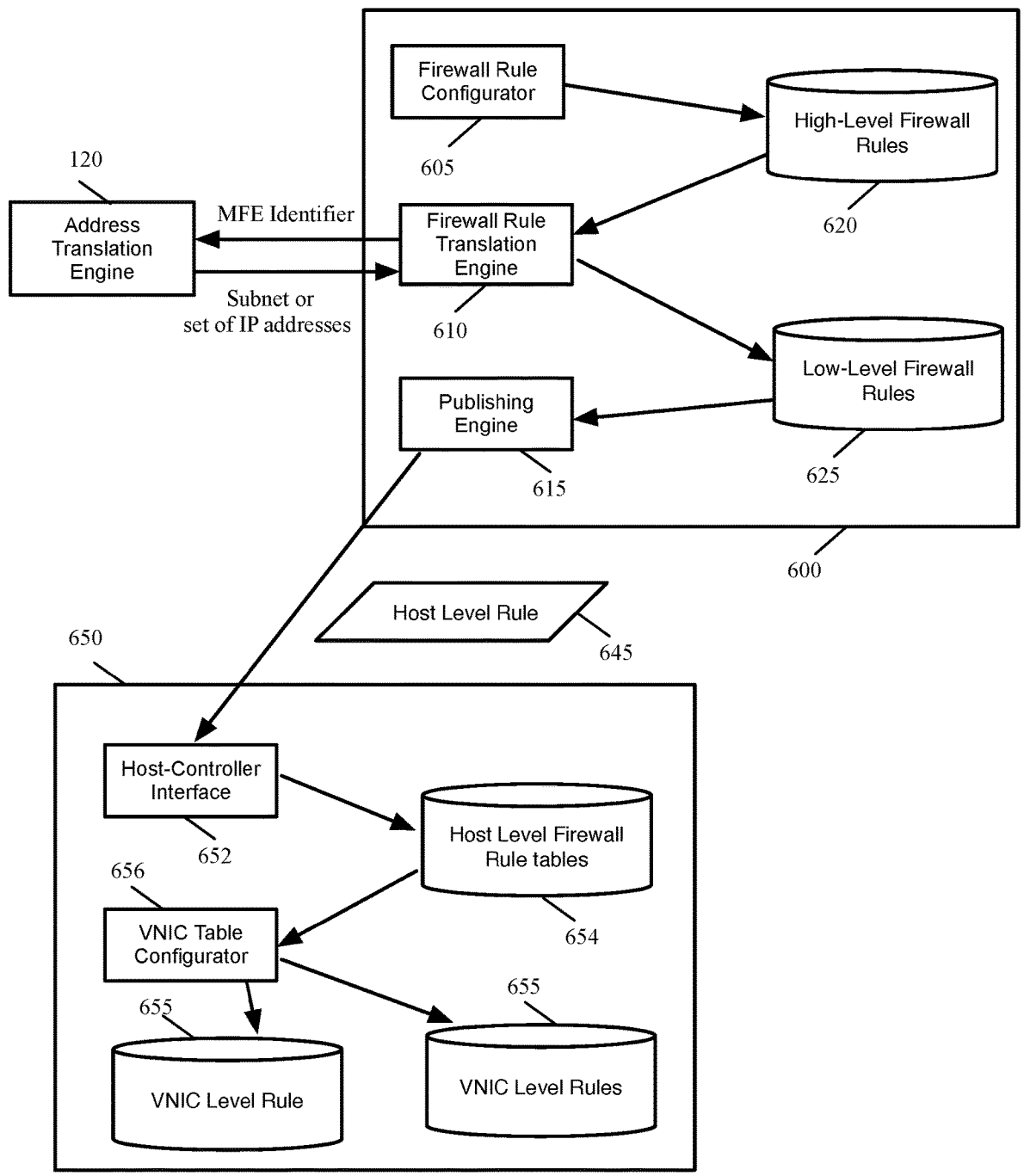
FIG. 6 conceptually illustrates a controller that configures firewall rules as well as one host that receives firewall rules that are distributed by the controller.

FIG. 6 conceptually illustrates one such controller 600, as well as one host 650 that receives firewall rules that are distributed by the controller 600. As shown, controller 600 includes a firewall rule configurator 605, a firewall rule translation engine 610, a publishing engine 615, a high-level rule data storage 620, and a low-level rule data storage 625. The example illustrated in FIG. 6 will be described by reference to FIG. 7, which illustrates several firewall rule tables that are created by the controller 600 and the host 650 in some embodiments of the invention.

The firewall rule configurator 605 configures the AppliedTo firewall rules by interacting with users (through one or more user-interface (UI) modules) and/or automated processes. The firewall rule configurator 605 allows users or automated processes to specify AppliedTo firewall rules in terms of high-level enforcement point identifiers. Examples of such high-level enforcement point identifiers are the high-level network, compute, and security constructs, such as logical switches, logical routers, logical networks, physical networks, compute clusters, datacenters, etc. The configurator 605 stores the AppliedTo firewall rules that it configures in the high-level firewall rule data storage 620.

FIG. 7 conceptually illustrates an example of a high-level firewall rule table 705 that the controller configures and stores in the high-level data storage 620 of some embodiments. As shown, the high-level firewall rule table 705 stores multiple AppliedTo firewall rules that have AppliedTo identifiers defined in terms of high-level constructs, such as a compute cluster, a datacenter, and a logical switch.

From the rule data storage 620, the firewall rule translation engine 610 retrieves the AppliedTo firewall rules, and converts the high-level enforcement point identifiers in the AppliedTo tuples of the retrieved rules to lower-level enforcement point identifiers. For instance, in some embodiments, the firewall rule translation engine converts compute constructs (e.g., datacenter identifiers, compute cluster identifiers, host identifiers, etc.) and network constructs (e.g., LFE identifiers, logical network identifiers, etc.) into VNIC values (VNIC identifiers) and wildcard values. FIG. 7 illustrates an example of a low-level firewall rule table 710. As shown, this table 710 contains the same firewall rules as the high-level firewall rule table 705 but each rule's AppliedTo identifier now specifies either a wildcard value 712 or a set of VNICs associated with the high-level identifiers.

In so converting the enforcement point identifiers, the firewall rule translation engine 610 ensures that all AppliedTo firewall rules are defined by low-level enforcement point identifiers that can be deciphered by all firewall-enforcing devices that receive the AppliedTo firewall rules. The firewall rule translation engine stores the AppliedTo firewall rules that it retrieves, and when necessary converts, in the rule data storage 625.

In some embodiments, the firewall rule translation engine 610 translates other parameters of the firewall rules from the data storage 620 before storing the translated rules in the data storage 625. For instance, in some embodiments, the source and destination identifiers of the higher level firewall rules might be specified in terms of high-level constructs (e.g., constructs such as "any VM connected to MFE 1 in host 1" 730, "any VM connected to MFE X in host Y" 735, containers such as web server (e.g., WS1 740), app server (e.g., AS10 745), database server (e.g., DBS1 750), etc.) that have to be converted to lower-level identifiers (e.g., specific IP addresses) before distributing the firewall rules to the firewall-enforcing devices.

As shown in FIG. 6, firewall rule translation engine 610 requests address translation engine 120 to translate the MFEs used in high-level firewall rules into a subnet or a set of IP addresses, as described in Section I above. For instance, firewall rule translation engine 610 provides the unique identifiers of "MFE 1 on host 1" and "MFE X on host Y" that are used in the high-level firewall rules 705 in FIG. 7 to the address translation engine 120. The address translation engine 120 provides a subnet or a set of IP addresses corresponding to each MFE to the firewall rule translation engine 610.

As shown in FIG. 7, the construct "any VM connected to MFE 1 in host 1" 730 is translated to a subnet "192.155.5.32/26" 755 and the construct "any VM connected to MFE X in host Y" 735 is translated to a subnet "192.169.5.0/26" 760. WS1 740, AS1 745, and DBS1 750 are single entities and the firewall rule translation engine 610 translates them into single IP addresses. In some embodiments, the rules that pertain to each host also include the AppliedTo rules that relate to VMs that may be instantiated on the host. In these embodiments, the firewall rule translation engine 610 provides the identifier of the MFE on the host to the address translation engine 120 and receives a subnet or a set of IP addresses that corresponds to the MFE and replaces the host identifier to the subnet or set of IP addresses in the low-level firewall rule table 710.

It should be understood that the translation engine operates differently in other embodiments. For instance, in some embodiments, the translation engine does not translate, or does not always translate, high-level source and destination identifiers to low-level source and destination identifiers. In some of these embodiments, the translation engine leaves this translation to some or all of the firewall-enforcing devices to do. Similarly, in some embodiments, the translation engine does not translate, or does not always translate, high-level AppliedTo identifiers to low-level AppliedTo identifiers for some or all of the firewall-enforcing devices, because the translation engine leaves this translation to some or all of the firewall-enforcing devices to do. Foregoing some or all of translation of the high-level firewall identifiers (e.g., AppliedTo, source and destination identifiers), simplifies the size and/or number of firewall rules that the controller distributes to the enforcing devices, but comes at the expense of requiring the enforcing devices to have the capability (e.g., the network state information) to perform this translation.

Even in some embodiments that have the controller distribute firewall rules with low-level AppliedTo identifiers (e.g., with only VNIC and wildcard values), the controller may not use a translation engine 610 that unpacks (i.e., converts) the high-level AppliedTo identifiers (e.g., the high-level network, compute, and/or security constructs) into low-level AppliedTo identifiers. For instance, each high-level AppliedTo identifier (e.g., each compute cluster identifier, LFE identifier, etc.) is specified as an object with a reference to a list of VNIC values. In some of these embodiments, the translation engine's job is to populate the VNIC list of the high-level identifier object with the identities or references to wildcard values or the VNICs that are members of the high-level AppliedTo identifier (e.g., are members of the compute cluster, the LFE, etc.). In some embodiments, the rule configurator 605 so populates the VNIC list, and hence in these embodiments, a translation engine is not used for any processing associated with the high-level AppliedTo identifiers.

For each data end node that should receive AppliedTo firewall rules, the publishing engine 615 (1) collects host-level AppliedTo rules 645 from the low-level data storage 625, and (2) distributes the collected firewall rules to the data end nodes. FIG. 6 shows the publishing engine distributing firewall rules to a multi-VM host 650. However, it should be understood that the publishing engine 615 is used to distribute firewall rules to several multi-VM hosts as well as other firewall-enforcing devices in other embodiments.

For each host, the publishing engine 615 identifies and retrieves from the lower-level data storage 625, the AppliedTo rules that pertain to the host. In some embodiments, the publishing engine only sends to each host the AppliedTo rules that pertain to the host. These AppliedTo rules in some embodiments include the AppliedTo rules that relate to VMs that are executing on the host. FIG. 7 illustrates an example of a host-level firewall rule table 715 that the publishing engine distributes to a host in some embodiments. This table only includes the AppliedTo firewall rules that are applicable to the recipient host. As such, this table is typically much smaller than the high-level and low-level AppliedTo tables 705 and 710, because table 715 contains AppliedTo rules that pertain to one host.

Each host 650 has a host-controller interface 652 that receives and stores the host-level rules in a host-level rules table 654. Each host also has a VM firewall configurator that from the host-level rules that are stored in the host-level rules tables 654 identifies and stores a subset of firewall rules for each VM that is executing on the host. In the embodiments illustrated in FIG. 6, the VM firewall configurator is a VNIC-table configurator 656 that generates one VNIC-level firewall rule set for each VNIC of each VM, by (1) using the AppliedTo data tuples in the host-level rules 654 to identify the firewall rules that are applicable to the VNIC, (2) retrieving the identified rules from the host-level rules, and (3) storing the retrieved rules in a VNIC-level firewall data storage 655 for each VNIC. In some embodiments, each VM has one VNIC. However, in other embodiments, some or all VMs can have more than one VNIC.

FIG. 7 illustrates an example of a VNIC-level firewall rule table 720. As shown in this table, the firewall rules in the VNIC-level firewall rule table do not include the AppliedTo tuple, and are each specified only in terms of five tuples (Source, Source Port, Destination, Destination Port, and Service identifiers) and the action value. As the VNIC-level firewall rule table contains only the set of rules that are applicable to a particular VNIC, this set of rules is smaller than the overall number of rules that the host stores for all the VMs executing on it. This smaller size allows for faster processing of the firewall rules by a firewall rule engine (not shown) of a host.

Figure 8:
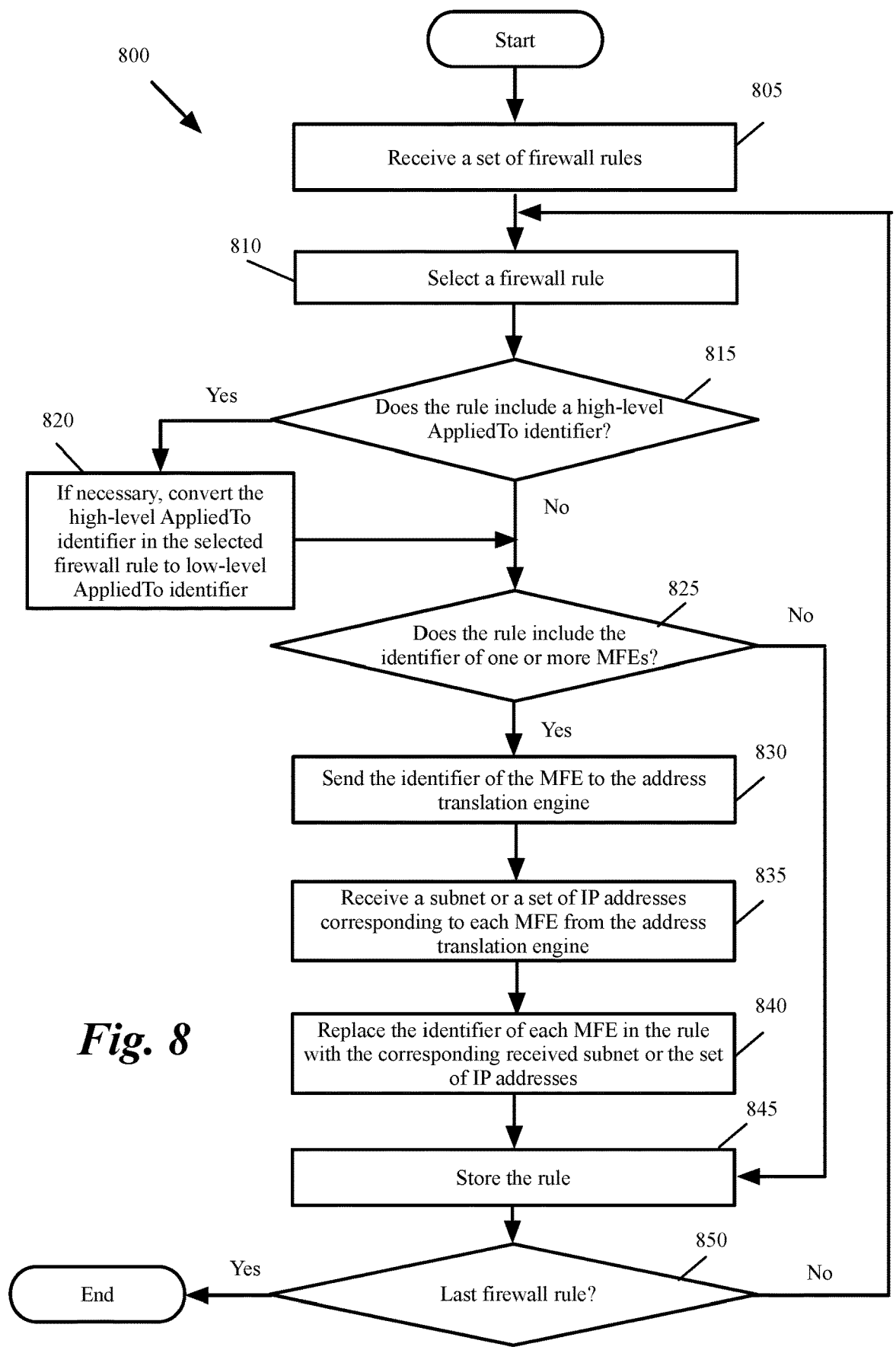
FIG. 8 conceptually illustrates a process that the firewall rules translation engine of the controller performs in some embodiments.

FIG. 8 conceptually illustrates a process 800 that the firewall rules translation engine 610 of the controller 600 performs in some embodiments. The process 800 in some embodiments is performed each time a set of AppliedTo firewall rules are stored in the high-level data storage 620. In some embodiments, the process 800 is performed as a batch process, while in other embodiments it is performed in real-time upon receiving a notification of the storage of the set of AppliedTo firewall rules in the high-level data storage 620.

As shown in FIG. 8, the process initially receives (at 705) the identity of the set of AppliedTo firewall rules that have been added to the high-level data storage. These rules may be specified in terms of high-level AppliedTo identifiers (e.g., high-level compute constructs, network constructs, and/or security groups) or low-level AppliedTo identifiers (e.g., VNIC and wildcard values).

The process then selects (at 810) one of the AppliedTo firewall rules in the received set. For instance, the process selects rule 790 in FIG. 7. Next, the process determines (at 815) whether the selected AppliedTo firewall rule has an AppliedTo identifier that is defined in terms of at least one high-level construct. If not, the process proceeds to 825, which is described below. Otherwise, the process converts (at 820) the high-level AppliedTo identifier to a low-level Applied to identifier. For instance, the process converts high-level AppliedTo identifiers (e.g., the high-level network construct, compute construct, and security groups) to low-level AppliedTo identifiers (e.g., to VNIC and wildcard values).

The process then determines (at 825) whether a source or destination in the selected rule includes an identifier of one or more MFEs. If not, the process proceeds to 845, which is described below. Otherwise, the process sends (at 830) the identifier of the MFEs to the address translation engine. For instance, the process sends the identifier of the MFEs from the firewall rule translation engine 610 to the address translation engine 120 as shown in FIG. 6.

The process then receives (at 835) a subnet or a set of addresses corresponding to each MFE from the address translation engine. For instance, the process the process receives a subnet or a set of IP addresses corresponding to each MFE at the firewall rule translation engine 610 from the address translation engine 120 as shown in FIG. 6. The process then replaces (at 840) the identifier of the MFEs in the rule with the corresponding received subnet of the set if IP addresses.

The process then stores (at 845) the rule. For instance, the process stress the rule in Table 710 in FIG. 7. At 850, the process determines whether it has examined all the AppliedTo firewall rules in the set received at 805. If not, the process returns to 810 to select another AppliedTo firewall rule. When the process determines (at 850) that it has examines all the AppliedTo firewall rules in the received set, the process ends.

In this manner, the process 800 converts high-level compute constructs (e.g., datacenter identifiers, compute cluster identifiers, host identifiers, etc.), network constructs (e.g., LFE identifiers, logical network identifiers, etc.), and security groups (formed by one or more network or compute constructs) in the AppliedTo firewall rule, into low-level identifiers (e.g., VNIC and wildcard values) and the MFE identifiers to the corresponding subnets of sets of IP addresses. In so converting the enforcement point identifiers, the translation process 800 ensures that all AppliedTo firewall rules are defined by low-level enforcement point identifiers that can be deciphered by all firewall-enforcing devices that receive the AppliedTo firewall rules.

Resolving MFEs into subnets instead of individual IP addresses ensures better performance during lookups. For instance, a firewall enforcement point may perform the lookups in an IP list maintained per filter (i.e., per VIF or Logical port) at the data path level for filtering the traffic. If the MFE can be translated into a subnet and it can be placed directly in the firewall rule instead of a container reference, filtering of the traffic is performed much faster as it would do a direct match with the values (source and destination fields) in the rule object itself instead of an indirect match with a list referenced by the rule object source and destination field.

To support universal logical switch in source/destination field, the translation is needed across multiple datacenters. Some embodiments utilize a stretched OSI L2 network where the subnet remains the same across multiple datacenters managed by multiple network managers. So unlike other objects, local translations and global translation for the MFEs would result in the same values, which can be consumed in source/destination field of universal rule part of universal section.

Figure 9:
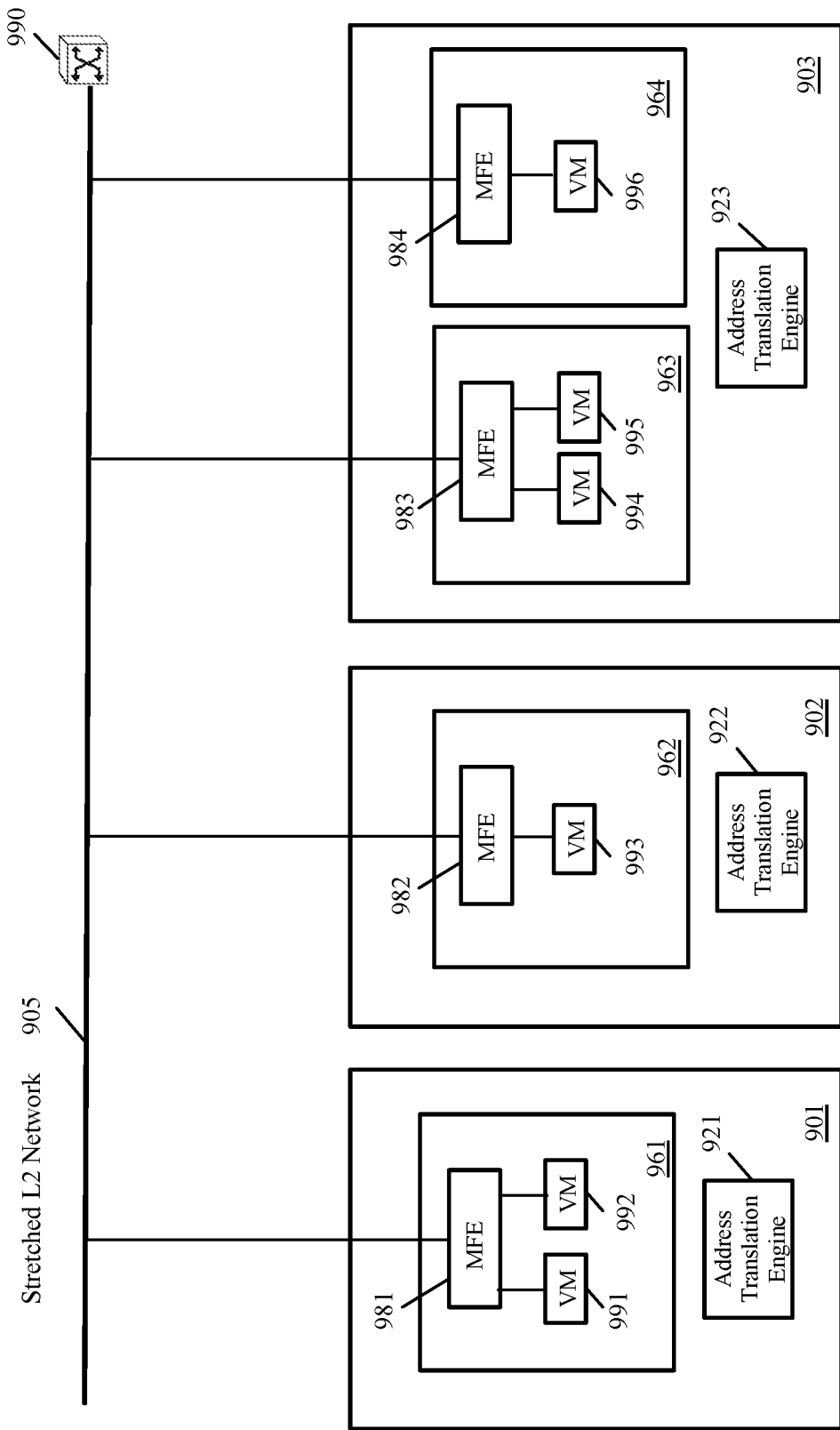
FIG. 9 conceptually illustrates an L2 network that stretches across several data centers in some embodiments.

FIG. 9 conceptually illustrates an L2 network that stretches across several data centers in some embodiments. Datacenter 901 includes an address translation engine 921, datacenter 902 includes an address translation engine 922, and datacenter 903 includes an address translation engine 923.

Each datacenter has several hosts, one or more of which are shown in FIG. 9. As shown, datacenter 901 includes host 961, datacenter 902 includes host 962, datacenter 903 includes hosts 963 and 964. Each host has an MFE one or more VMs. Host 961 has MFE 981 and VMs 991-992. Host 962 has MFE 982 and VM 993. Host 963 has MFE 983 and VMs 994-995. Host 964 has MFE 984 and VM 996.

The VMs 991-996 are connected by the stretched L2 network 905. The routing is provided by global virtual distributed router (VDR) 990. A VDR provides a one-hop routing that enables a packet to be sent between two LFEs without going through a gateway. Each translation engine 921-923 translates the MFEs 981-983 in their corresponding datacenter into a subnet or a set of IP addresses. Since the MFEs are connected to the same stretched L2 network, the local translations and global translation for the MFEs into subnets and or sets of IP addresses would result in the same values. These values can be consumed in source/destination field of a universal rule part of firewall rules.

III. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 10:
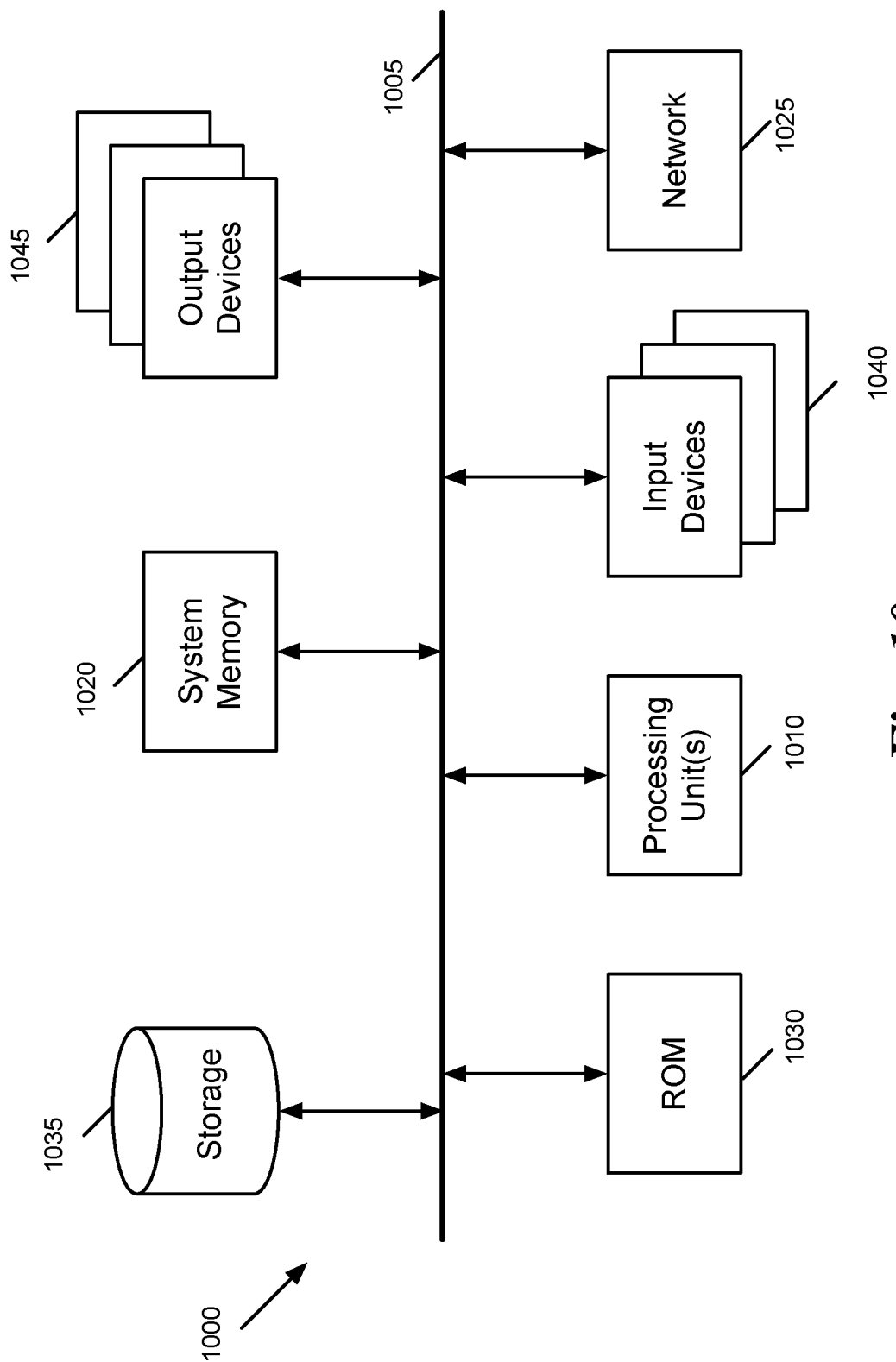
FIG. 10 conceptually illustrates an electronic system with which some embodiments of the invention are implemented.

FIG. 10 conceptually illustrates an electronic system 1000 with which some embodiments of the invention are implemented. The electronic system 1000 can be used to execute any of the control, virtualization, or operating system applications described above. The electronic system 1000 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 1000 includes a bus 1005, processing unit(s) 1010, a system memory 1020, a read-only memory (ROM) 1030, a permanent storage device 1035, input devices 1040, and output devices 1045.

The bus 1005 collectively represents all system, peripheral, and chipset buses that communicatively connect the numerous internal devices of the electronic system 1000. For instance, the bus 1005 communicatively connects the processing unit(s) 1010 with the read-only memory 1030, the system memory 1020, and the permanent storage device 1035.

From these various memory units, the processing unit(s) 1010 retrieve instructions to execute and data to process in order to execute the processes of the invention. The processing unit(s) may be a single processor or a multi-core processor in different embodiments.

The read-only-memory 1030 stores static data and instructions that are needed by the processing unit(s) 1010 and other modules of the electronic system. The permanent storage device 1035, on the other hand, is a read-and-write memory device. This device is a non-volatile memory unit that stores instructions and data even when the electronic system 1000 is off. Some embodiments of the invention use a mass-storage device (such as a magnetic or optical disk and its corresponding disk drive) as the permanent storage device 1035.

Other embodiments use a removable storage device (such as a floppy disk, flash drive, etc.) as the permanent storage device. Like the permanent storage device 1035, the system memory 1020 is a read-and-write memory device. However, unlike storage device 1035, the system memory is a volatile read-and-write memory, such as random access memory. The system memory stores some of the instructions and data that the processor needs at runtime. In some embodiments, the invention's processes are stored in the system memory 1020, the permanent storage device 1035, and/or the read-only memory 1030. From these various memory units, the processing unit(s) 1010 retrieve instructions to execute and data to process in order to execute the processes of some embodiments.

The bus 1005 also connects to the input and output devices 1040 and 1045. The input devices enable the user to communicate information and select commands to the electronic system. The input devices 1040 include alphanumeric keyboards and pointing devices (also called "cursor control devices"). The output devices 1045 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 10, bus 1005 also couples electronic system 1000 to a network 1025 through a network adapter (not shown). In this manner, the computer can be a part of a network of computers (such as a local area network ("LAN"), a wide area network ("WAN"), or an Intranet, or a network of networks, such as the Internet. Any or all components of electronic system 1000 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral or transitory signals.

While the invention has been described with reference to numerous specific details, one of ordinary skill in the art will recognize that the invention can be embodied in other specific forms without departing from the spirit of the invention. In addition, a number of the figures (including FIGS. 2 and 8) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface module, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

In view of the foregoing, one of ordinary skill in the art would understand that the invention is not to be limited by the foregoing illustrative details, but rather is to be defined by the appended claims.

What is claimed is:

1. A method of specifying and distributing rules for processing packets associated with a logical forwarding element (LFE) implemented by a plurality of physical forwarding elements executing on a plurality of host computers, the LFE part of a logical network defined over a physical network on which several other logical networks are defined, the method comprising:
   receiving, for a rule that is expressed in terms of at least one identifier associated with the logical network, a request to provide a set of valid network addresses associated with the LFE in the logical network;
   determining whether the LFE is associated with a subnet of valid network addresses;
   in response to the request for the set of valid network addresses:

when the LFE is associated with the subnet of valid network addresses, providing the subnet of valid network addresses associated with the LFE as the set of valid network addresses; and when the LFE is not associated with the subnet of valid network addresses, providing a list of one or more individual network addresses associated with the LFE as the set of valid network addresses;

replacing the identifier with the provided set of valid network addresses in order to express the rule in terms of the set of valid network addresses instead of the identifier associated with the logical network; and distributing the rule to a set of the host computers to use to process packets associated with the LFE.

2. The method of claim 1, wherein the LFE is a logical router, wherein determining whether a subnet of valid network addresses is associated with the LFE comprises identifying a subnet associated with the logical router.

3. The method of claim 1, wherein a set of logical ports is associated with the LFE, wherein determining whether a subnet of valid network addresses is associated with the LFE comprises identifying network addresses of the set of logical ports.

4. The method of claim 1, wherein the subnet of valid network addresses is a subnet of Internet protocol (IP) addresses.

5. The method of claim 1, wherein the network is stretched across a plurality of datacenters.

6. The method of claim 1, wherein the identifier associated with the logical network is an LFE identifier.

7. A non-transitory computer readable medium storing a program for specifying and distributing rules for processing packets associated with a logical network implemented by a plurality of physical forwarding elements executing on a plurality of host computers, the program executable by a processing unit, the program comprising a set of instructions for:

receiving, for a rule that is expressed in terms of at least one identifier associated with the logical network, a request to provide a set of valid network addresses associated with a logical entity in the logical network;

determining whether the logical entity is associated with a subnet of valid network addresses;

in response to the request for the set of valid network addresses:

when the logical entity is associated with the subnet of valid network addresses, providing the subnet of valid network addresses associated with the logical entity as the set of valid network addresses; and when the logical entity is not associated with the subnet of valid network addresses, providing a list of one or more individual network addresses associated with the logical entity as the set of valid network addresses;

replacing the identifier with the provided set of valid network addresses in order to express the rule in terms of the set of valid network addresses instead of the identifier associated with the logical network; and distributing the rule to a set of the host computers to use to process packets associated with the logical entity.

8. The non-transitory computer readable medium of claim 7, wherein the logical entity is a logical router that is implemented by the plurality of physical forwarding elements, wherein the set of instructions for determining whether a subnet of valid network addresses is associated with the logical entity comprises a set of instructions for identifying a subnet associated with the logical router.

9. The non-transitory computer readable medium of claim 7, wherein the logical entity is a dynamic host configuration protocol (DHCP) server, wherein the set of instructions for determining whether a subnet of valid network addresses is associated with the logical entity comprises a set of instructions for identifying one of a DHCP address pool and a set of network addresses via static bindings associated with the logical entity.

10. The non-transitory computer readable medium of claim 7, wherein a set of logical ports is associated with the logical entity, wherein the set of instructions for determining whether a subnet of valid network addresses is associated with the logical entity comprises a set of instructions for identifying network addresses of the set of logical ports.

11. The non-transitory computer readable medium of claim 7, wherein the subnet of valid network addresses is a subnet of Internet protocol (IP) addresses.

12. The non-transitory computer readable medium of claim 7, wherein the network is stretched across a plurality of datacenters.

13. A system comprising:
a set of processing units; and
a non-transitory computer readable medium storing a program for specifying and distributing rules for processing packets associated with a logical network implemented by a plurality of physical forwarding elements executing on a plurality of host computers, the program executable by one of the processing units, the program comprising a set of instructions for:

receiving, for a rule that is expressed in terms of at least one identifier associated with the logical network, a request to provide a set of valid network addresses associated with a logical entity in the logical network;

determining whether the logical entity is associated with a subnet of valid network addresses;

in response to the request for the set of valid network addresses:

when the logical entity is associated with the subnet of valid network addresses, providing the subnet of valid network addresses associated with the logical entity as the set of valid network addresses; and when the logical entity is not associated with the subnet of valid network addresses, providing a list of one or more individual network addresses associated with the logical entity as the set of valid network addresses;

replacing the identifier with the provided set of valid network addresses in order to express the rule in terms of the set of valid network addresses instead of the identifier associated with the logical network; and distributing the rule to a set of the host computers to use to process packets associated with the logical entity.

14. The system of claim 13, wherein the logical entity is a logical router that is implemented by the plurality of physical forwarding elements, wherein the set of instructions for determining whether a subnet of valid network addresses is associated with the logical entity comprises a set of instructions for identifying a subnet associated with the logical router.

15. The system of claim 13, wherein the logical entity is a dynamic host configuration protocol (DHCP) server, wherein the set of instructions for determining whether a subnet of valid network addresses is associated with the logical entity comprises a set of instructions for identifying one of a DHCP address pool and a set of network addresses via static bindings associated with the logical entity.

16. The system of claim 13, wherein a set of logical ports is associated with the logical entity, wherein the set of instructions for determining whether a subnet of valid network addresses is associated with the logical entity comprises a set of instructions for identifying network addresses of the set of logical ports.

17. The system of claim 13, wherein the subnet of valid network addresses is a subnet of Internet protocol (IP) addresses.

18. The non-transitory computer readable medium of claim 7, wherein the request comprises an identification of the logical entity.

19. The non-transitory computer readable medium of claim 7, wherein the identifier associated with the logical network is a security group.

20. The non-transitory computer readable medium of claim 7, wherein the identifier identifies the logical network.

* * * * *